United States Patent [19]
Kimura et al.

[11] Patent Number: 4,604,833
[45] Date of Patent: Aug. 12, 1986

[54] TABLE MECHANISM

[75] Inventors: Sosaku Kimura, Nerima; Takeshi Okabe, Hino; Toshikazu Hatsuse, Tanashi, all of Japan

[73] Assignee: Citizen Watch Co., Ltd., Tokyo, Japan

[21] Appl. No.: 807,311

[22] Filed: Dec. 10, 1985

[30] Foreign Application Priority Data

Jul. 2, 1985 [JP] Japan .................................. 60-145113

[51] Int. Cl.⁴ ............................................. B24B 41/06
[52] U.S. Cl. .................................. 51/165.8; 51/240 R; 409/219; 409/904
[58] Field of Search ............. 51/165.8, 165.81, 240 R; 409/219, 904

[56] References Cited

U.S. PATENT DOCUMENTS 3,355,990 12/1967 Thum ................................. 409/219
3,818,642 6/1974 Seidel ................................. 51/165.8

FOREIGN PATENT DOCUMENTS 2082096 3/1982 United Kingdom ............... 51/165.8
3401583 7/1984 United Kingdom ............. 51/240 R Primary Examiner—Harold D. Whitehead
Attorney, Agent, or Firm—Koda and Androlia

[57] ABSTRACT

A table mechanism comprising two hydrostatically coupled tables, a main table and an auxiliary table, in which after clamping the main table, the gaps in the hydrostatically coupling portions of the tables are adjusted so as to position the auxiliary table precisely.

3 Claims, 7 Drawing Figures

TABLE MECHANISM

BACKGROUND OF THE INVENTION

1. Field of the Invention

This invention relates to a table mechanism requiring precise control of position for use in ultraprecision machine tools, manufacturing machines for semiconductors or the like, etc., especially in surface finish grinding of semiconductor wafer substrates, grinding of magnetic heads and machining of lenses.

2. Description of the Related Art

In general, table mechanisms moving straight are available in the following types:

(1) a feed screw type in which a feed screw attached rotatably in its axial direction to the supports is turned to move the table through the nuts attached to the table.

(2) a rack and pinion type in which a pinion provided on the support is engaged with a rack mounted on the table side and is driven to move the table.

(3) a wire type in which a wire connected to the support is tightened up to move the table which has slided along the support.

In the feed screw (regular screw of ball screw) mechanism of (1), an error in mounting the table guideway and the feed screw, a deflection caused by the weight of the screw, or a disturbance exerted by twisting motion of the screw will affect the table through the nuts. Especially in the case of the workpiece formed of a hard brittle material such as the aforementioned semiconductor wafers, magnetic heads or lenses, if vibration occurs to the workpiece, fine vibration, for example, may cause chipping and affect machining accuracy. On the other hand, in the rack and pinion system of (2), since the engagement of the rack and pinion produces forces perpendicular to the table movement direction, the machining acuracy is adversely affected. Unlike the above-mentioned two systems, in the wire system of (3), no disturbance occurs, but the wire is apt to elongage, thereby deteriorating the rigidity in the driving system.

SUMMARY OF THE INVENTION

Considered from the above-mentioned problems, the object of the invention is to provide a table mechanism which permits precise positioning without effects of errors in the feed screw system and is designed to enhance the rigidity in the tables, in which by use of a hydrostatic fluid for transmitting the driving forces of the tables in their sliding direction, the tables are driven without making any contact.

According to the present invention, there is provided a table mechanism comprising: a bed; a horizontal guide and a vertical guide of the bed or formed on the bed; a pair of supports fixed to the bed; a motor fixed to one of the pair of supports; a feed screw supported rotatably by the supports, connected to the motor and adapted to be turned by the motor; a first table including nuts for screwing onto the feed screw and having a lower extension engagedly guided by the vertical guide and horizontal extensions engagedly guided by the horizontal guide, the first table moving straight through the nuts screwed onto the feed screw connected to the motor and adapted to be turned by the motor; a second table having lower extensions engagedly guided by the vertical guide and horizontal extensions engagedly guided by the horizontal guide; wherein, of the opposite surfaces between the lower extension of the first table and each of the lower extensions of the second table, on a pair of opposite surfaces opposed at right angles to a direction of movement of the tables, hydrostatically coupling portions comprising hydrostatic pads are formed; and between the upper surfaces of the horizontal extensions of both the tables and the horizontal guide, and between the lower surfaces of the horizontal extensions of both the tables and the horizontal guide, hydrostatically supporting horizontal portions comprising hydrostatic pads are formed; gap detecting means provided on the hydrostatically coupling portions for detecting gaps in the hydrostatically coupling portions; second table position detecting means provided on the second table for detecting an amount of movement of the second table; a control unit for giving a movement command to the first table, computing a difference between the movement command value and the value of movement from the second table position detecting means for detecting the amount of movement of the second table, and giving a position correcting command to the second table; a first error detecting means for detcting a difference between the second table position correcting signal from the control unit and the gap detecting signal from the gap detecting means, and producing an error signal; a servo amplifier for amplifying the error signal; and a servo valve for supplying differential pressures to the hydrostatically coupling portions in synchronism with the error signal of the servo amplifier; wherein the second table is first moved by the movement of the first table which has been moved under the movement command from the control unit and by hydrostatically coupling forces produced between the first table and the second table, and then positioned precisely by supplying differential pressures to the hydrostatically coupling portions of the first and second tables under the position correcting command from the control unit.

DETAILED DESCRIPTION OF THE PREFERRED EMBODIMENT

Figure 1:
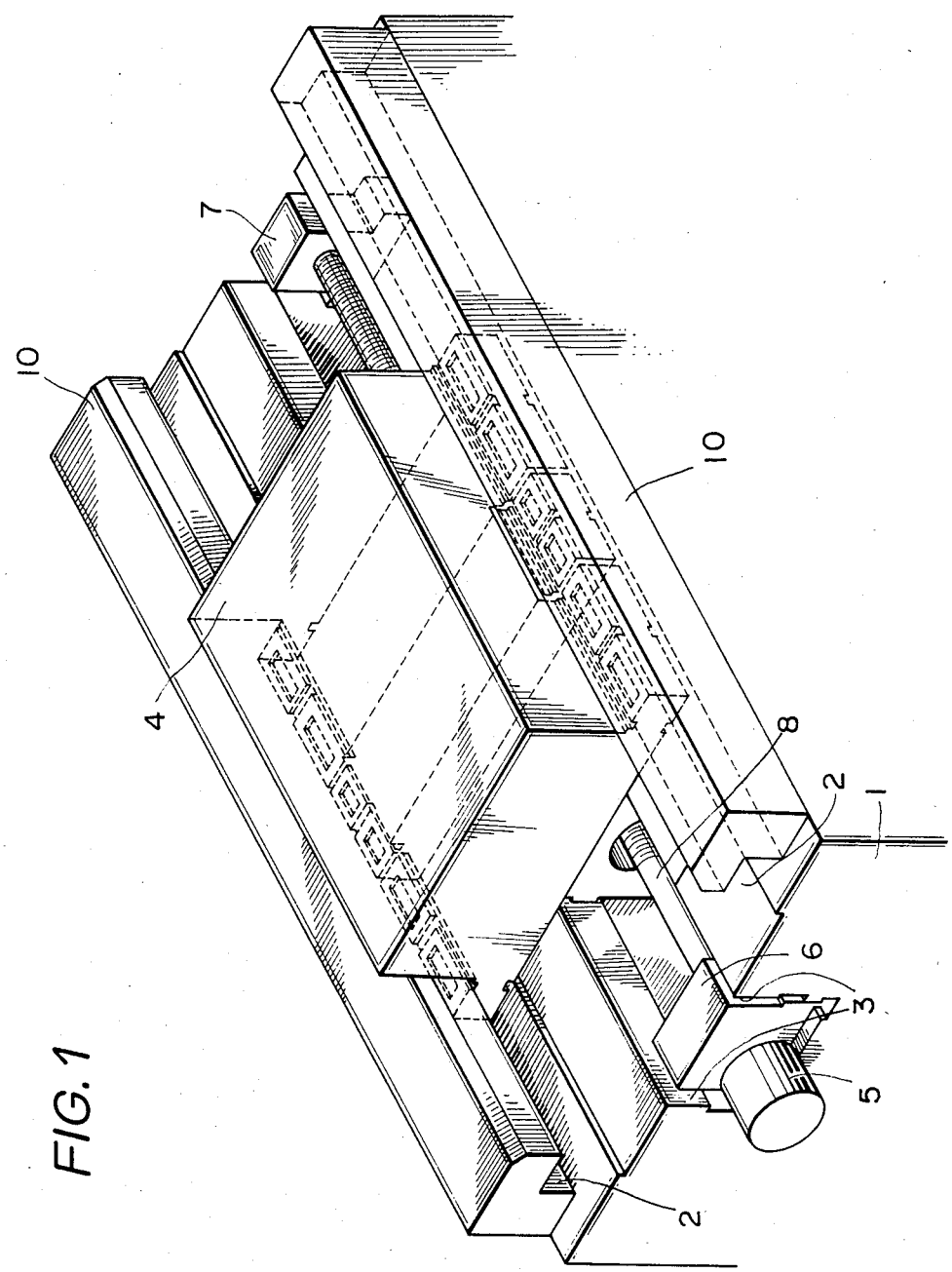
FIG. 1 is a perspective view of a table mechanism in accordance with the invention.

The embodiment of the invention will now be described with reference to the accompanying drawings:

FIG. 1 is a perspective view of a table mechanism including a bed and guides in the form of guide plates mounted on the bed in accordance with the invention in which 1 is the bed; 2 and 3 the horizontal and vertical hydrostatic guides; 4 a second table; 5 a motor; 6 and 7 supports; 8 a feed screw; and 10 the guide plates.

Figure 2:
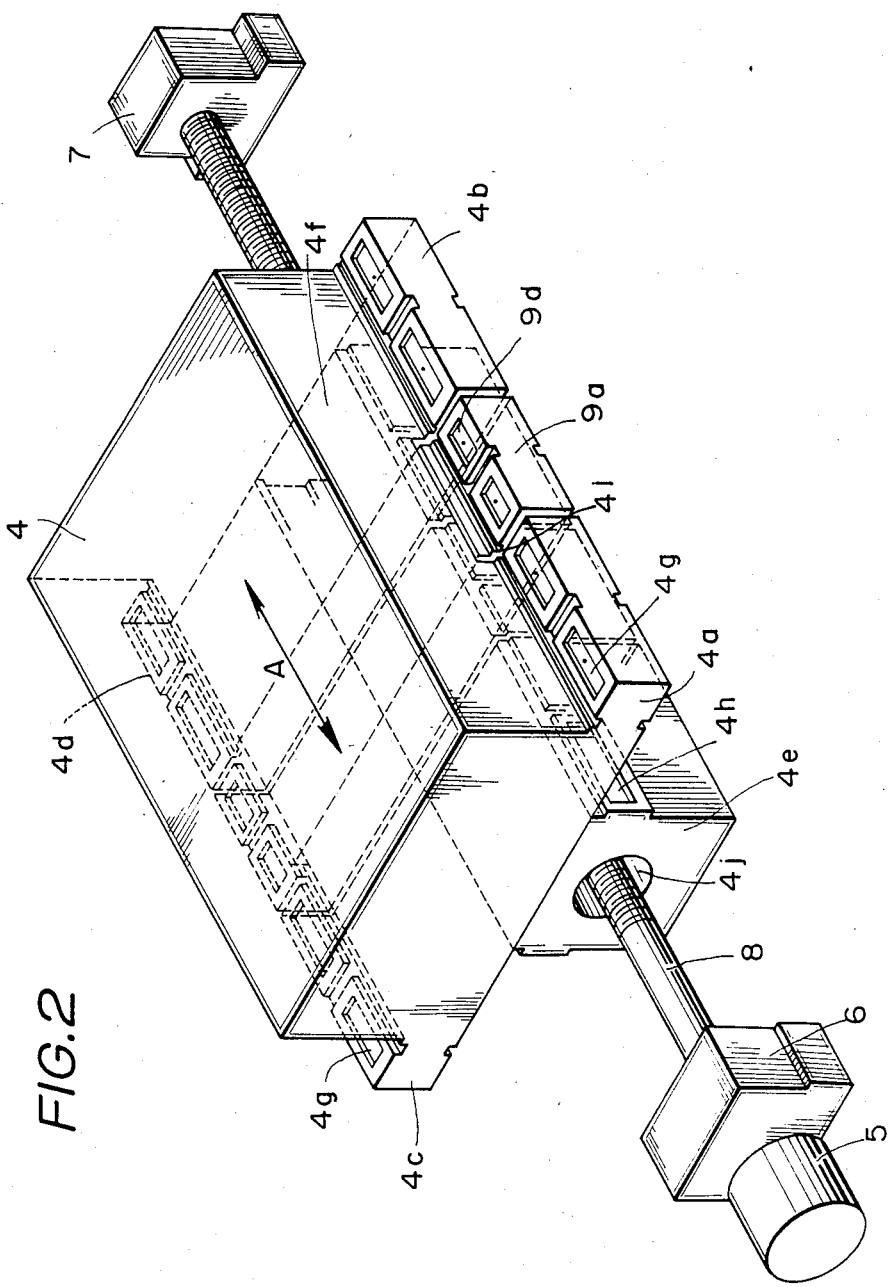
FIG. 2 is a perspective view of the table mechanism of FIG. 1 in which the guides of FIG. 1 are removed.

FIG. 2 is a perspective view of the table mechanism of FIG. 1 in which the bed 1 and the guide plates 10 mounted on the bed are removed. The second table 4 has horizontal extensions 4a, 4b, 4c and 4d and lower extensions 4e and 4f, and on both sides of each extension are disposed a plurality of hydrostatic pads 4g and 4h. In addition, the second table 4 has a generally U-shaped recess 4i in the lower surface thereof for loosely fitting the first table 9 (details will be described later). The second table 4 engages the bed 1, the horizontal hydrostatic guides 2 in the form of guide plates 10 mounted on the bed, and the vertical hydrostatic guides 3 formed on the bed at the horizontal extensions 4a, 4b, 4c and 4d and the lower extensions 4e and 4f and moves straight in the direction of arrow A.

Figure 3:
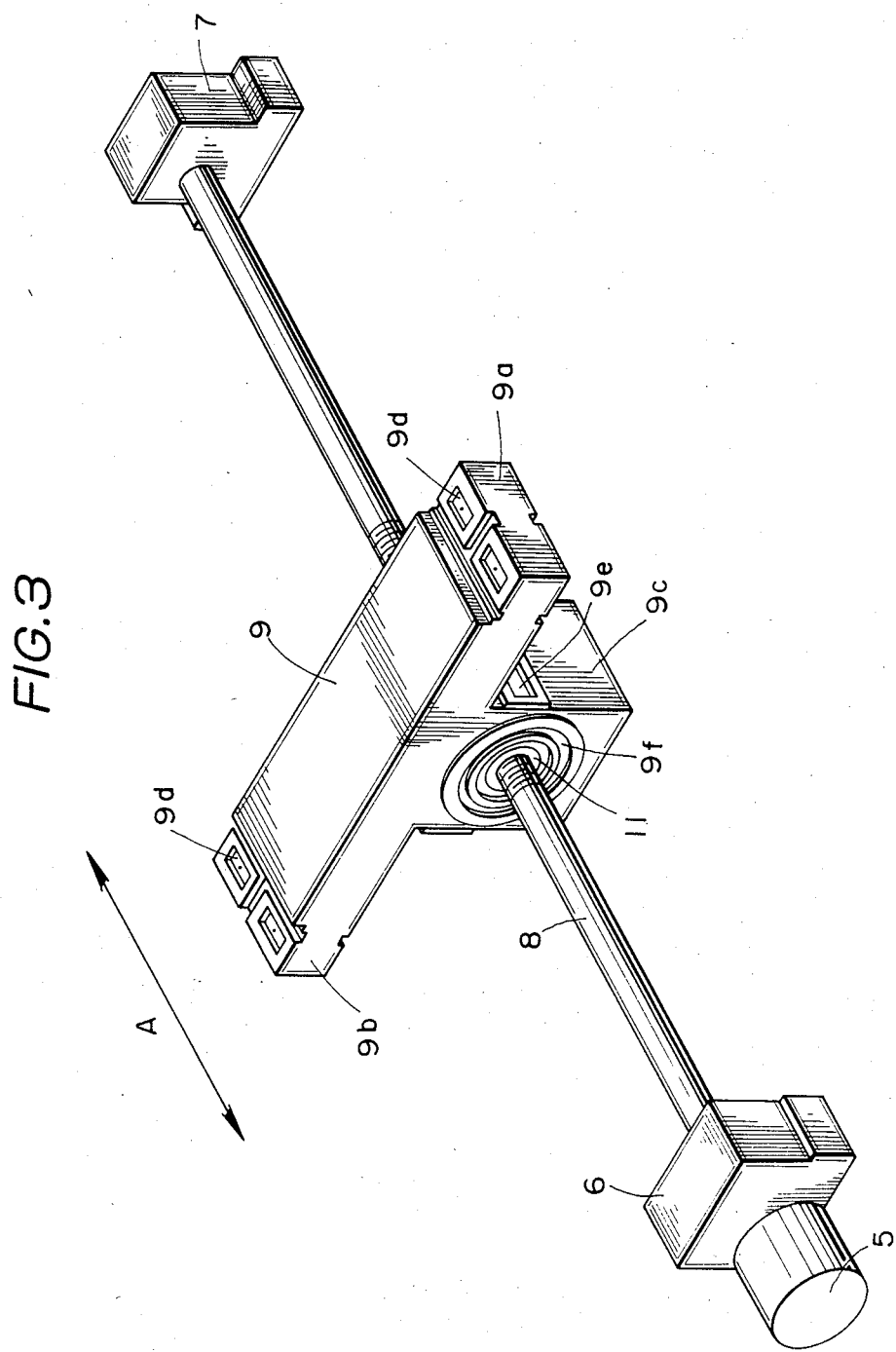
FIG. 3 is a perspective view of a first table.

FIG. 3 is a perspective view of the first table 9. The first table 9 has horizontal extensions 9a and 9b and a lower extension 9c which are guided along the aforementioned hydrostatic guides 2 and 3 and provided with a plurality of hydrostatic pads 9d and 9e on the surfaces thereof in parallel with the sliding direction of the lower extension 9c. To the lower extension 9c are attached nuts 11 which are screwed onto the feed screw 8. 9f denotes a ring-shaped hydrostatic pad at right angles to the sliding direction, and at the back side of the pad 9f is disposed a similar hydrostatic pad.

Figure 4:
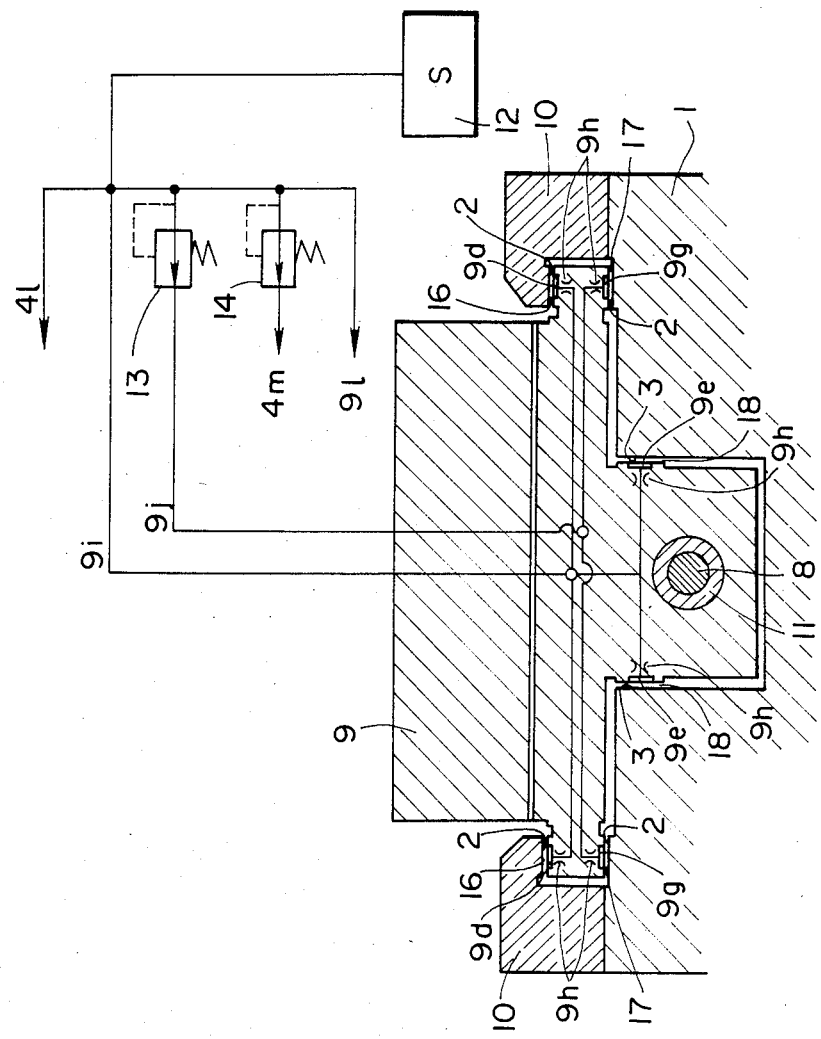
FIG. 4 is a sectional view of the first table.

The embodiment will now be detailed with reference to the following sectional views. FIG. 4 is a sectional view of the first table taken at right angles to the sliding direction thereof. A hydrostatic fluid forced from a hydraulic unit 12 is branched by a line 9i and sent via each of associated chokes 9h to each of the hydrostatic pads 9d and 9e. On the other hand, a hydrostatic fluid flowing from the hydraulic unit 12 via a pressure-reducing valve 13 and having an adjustable supply pressure is branched by a line 9j and sent via each of associated chokes 9h to each of hydrostatic pads 9g. For the bed 1, the hydrostatic guides 2 in the form of the guide plates 10 mounted on the bed 1 and the hydrostatic guides 3 formed on the bed, each small gap 16 is provided between each of the horizontal extensions 9a and 9b of the first table 9 and each of the guide plates 10, each small gap 17 is provided between each of the horizontal extensions 9a and 9b of the first table 9 and the bed 1, and each small gap 18 is provided between the lower extension 9c of the first table 9 and the bed 1. Thus the first table 9 is hydrostatically supported horizontally and vertically.

Figure 5:
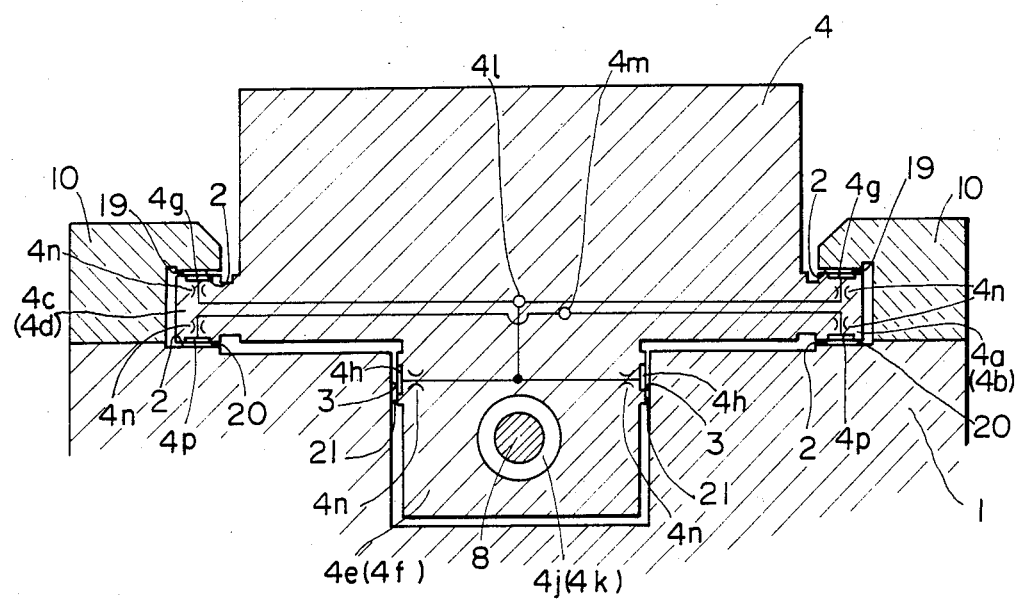
FIG. 5 is a sectional view of a second table.

FIG. 5 is a sectional view of the second table taken at right angles to the sliding direction thereof. A hydrostatic fluid forced from the hydraulic unit 12 of FIG. 4 is branched by a line 4l and sent via each of associated chokes 4n to each of hydrostatic pads 4g and 4h. On the other hand, a hydrostatic fluid flowing from the hydraulic unit 12 (FIG. 4) via a pressure-reducing valve 14 (FIG. 4) and having an adjustable supply pressure is branched by a line 4m and sent via each of associated chokes 4n to each of hydrostatic pads 4p. For the bed 1, the horizontal hydrostatic guides 2 in the form of guide plates 10 mounted on the bed 1 and the vertical hydrostatic guides 3 formed on the bed 1, each small gap 19 is provided between each of the horizontal extensions 4a, 4b, 4c and 4d and each of the guide plates 10, each small gap 20 is provided between each of the horizontal extensins 4a, 4b, 4c and 4d and the bed 1, and each small gap 21 is provided between the lower extension 4e (4f) of the second table 4 and the bed 1. Thus the second table 4 is hydrostatically supported horizontally and vertically.

Figure 6:
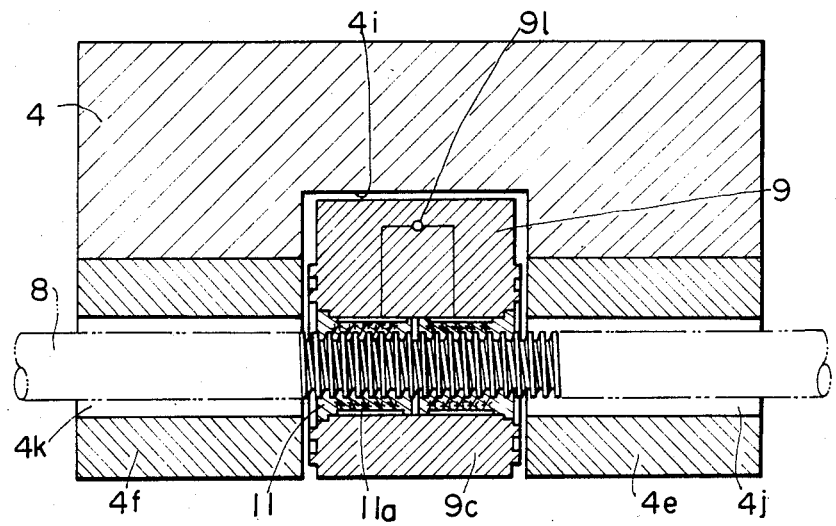
FIG. 6 is a sectional view of the table mechanism taken on the plane in the axial direction thereof.

FIG. 6 is a sectional view of the table mechanism taken on the plane in the axial direction thereof. The second table 4 is provided with lower extensions 4e and 4f at its lower surface for housing the first table 9 hydrostatically by means of the small gaps defined therebetween. 4j and 4k are through holes in which the feed screw 8 is inserted so as to move freely therein. The feed screw 8 is a hydrostatic feed screw. The nuts 11 are opposed to each other in the axial direction of the feed screw 8, attached to the ends of the first table 9, and screwed onto the feed screw 8. A hydrostatic fluid for the nuts 11 is forced from the hydraulic unit 12 of FIG. 4, branched by a line 9l and supplied to the feed screw surface through a plurality of chokes 11a. Although this embodiment uses a hydrostatic screw, it will be understood that other screws such as a ball screw may be used instead.

Figure 7:
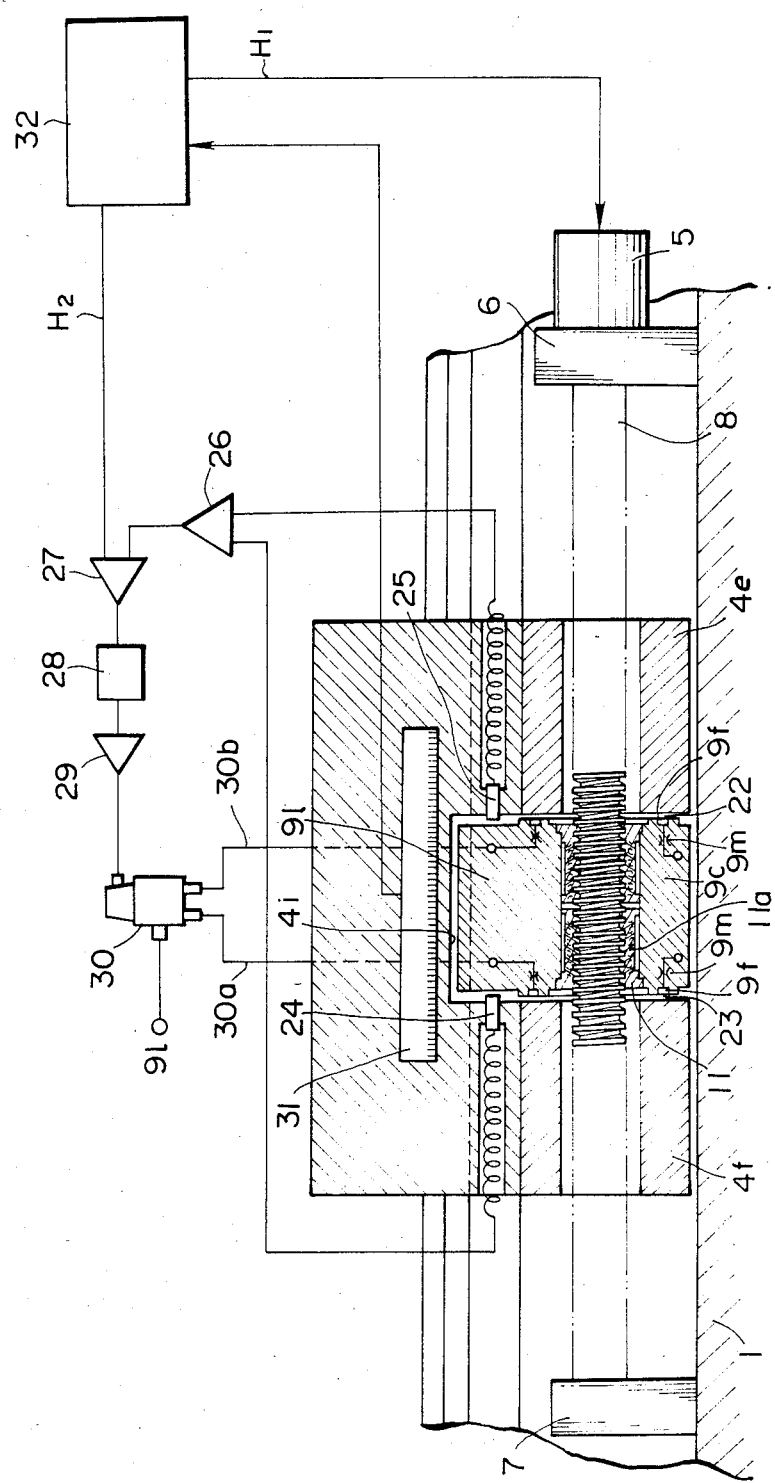
FIG. 7 is another sectional view of the table mechanism taken on the plane in the axial direction thereof.

FIG. 7 is another sectional view of the table mechanism taken on the plane in the axial direction thereof illustrating the hydrostatically coupling portions provided on the opposite surfaces of the lower extensions 4e and 4f of the second table 4 and the lower extension 9c of the first table 9. 22 and 23 are small gaps between the opposite surfaces. The lower extension 9c of the first table 9 is provided with concentric ring-shaped hydrostatic pads 9f around the feed screw 8, the hydrostatic pads 9f being located at right angles to the sliding direction of the lower extension 9c and facing each of the opposite surfaces of the second table 4. 24 and 25 are gap detectors provided on the second table 4, for detecting each gap in a pair of opposite surfaces oppositely facing at right angles to the sliding direction of the tables 4 and 9, of the hydrostatically coupling surfaces opposed between the lower extension 9c of the first table 9 and each of the lower extensions 4e and 4f of the second table 4. 31 is a table position detecting means (glass scale) provided on the second table 4, for detecting the displacement of the second table 4 with respect to the reference position (not shown) of the bed 1. By detecting optically the graduations of the scale 31, the amount of displacement of the second table 4 is known with the number of pulses produced every graduation. 32 is a control unit for giving driving commands $H_1$ and $H_2$ to the first table 9 and the second table 4, respectively. The first table 9 is driven through the motor 5, the feed screw 8 turned by the motor 5, and the nuts 11 engaged with the feed screw 8. The second table 4 is driven through the hydrostatically coupling portions. Outputs of the gap detectors 24 and 25 are connected to a pair of inputs of a differential amplifier 26 (second error detecting means), and the output of the differential amplifier 26 and the second table driving command $H_2$ from the control unit 32 are sent to a pair of inputs of a differential amplifier 27 (first error detecting means). Then, the output of the error detecting means 27 is supplied by way of a phase-delay control circuit 28 and a servo amplifier 29 to a servo valve 30. As a result, the servo valve 30 applies differential pressures under the command $H_2$ to the pair of hydrostatically coupling portions. Table driving commands $H_1$ and $H_2$ from the control unit 32 are carried out in sequence. First, when the command $H_1$ is given, the motor 5 is rotated and the first table 9 is moved by the command. Then, in accordance with the movement of the first table 9, the second table 4 is driven together by the thrust imparted from the hydrostatically coupling portions. Since in this driven state, the differential pressures are set at zero, the second table 4 is driven in exact accordance with the movement of the first table 9. The amount of movement of the second table 4 is detected by the second table position detecting means (glass scale) 31 and fed back to the control unit 32. The control unit 32 computes the difference between the value of command $H_1$ and the fed back amount and then generates a second table driving command $H_2$ in accordance with that difference. This command $H_2$ is given to one of the inputs of the differential amplifier 27 and sent by way of the phase-delay control amplifier 28 and the servo amplifier 29 to the servo valve 30. Then, the servo valve 30 gives differentially fluid pressures to the opposite hydrostatic pads 9f in the pair of hydrostatic coupling portions to vary the aforementioned gaps 22 and 23, thereby moving slightly the second table 4 in the sliding direction. Next, differential pressures imposed on the hydrostatic coupling portions are detected by the differential amplifier 26, and the result is fed back to the differential amplifier 27. As a result, the servo valve 30 supplies the differential pressures to the second table 4 until the amount fed back from the differential amplifier 26 equals the amount of command $H_2$ from the control unit 32. At the time when these amounts equal, the servo valve 30 continues to supply the same differential pressures to the coupling portions to hold hydrostatically the second table 4 in that position. At this time, the supply pressures to the line 9j of FIG. 4 are 0 to release the hydrostatically holding forces of the hydrostatic pads 9g. Thus the hydrostatically supporting forces of the opposed hydrostatic pads 9d permit the first table 9 to be firmly fixed to the bed 1. As a result, the first table 9 has a high holding rigidity. With this first table 9 as a reference, in response to the control signal $H_2$ mentioned above, the servo valve 30 applies fluid pressures differentially to the opposed hydrostatic pads 9f to vary the small gaps 22 and 23. Thus the second table 9 can be moved with high rigidity and high accuracy. Besides, the hydrostatically supporting forces of the hydrostatic pads 4p of FIG. 5 are such that a minimum oil film is maintained so as not to develop static friction between the second table 4 and the bed 1, and the action of the hydrostatically supporting forces of the opposed hydrostatic pads 4g supports the second table 4 under low hydrostatic pressure. Thus, the enhanced positioning accuracy and rigidity of the second table 4 itself provide a table mechanism with high accuracy and high rigidity. Although as a displacement detector this embodiment uses an electrical non-contact detector, it will be understood that a pressure detector may be used for detecting the gaps by pressure. Also although oil is chosen as the hydrostatic fluid in the above-mentioned description, it will be understood that air can be used if the shapes of the hydrostatic pads are changed.

As clearly shown in the above-mentioned description, according to the invention, when a control unit (not shown) commands the second table to effect the desired feed, the motor and hence the feed screw are turned to move the first table in the axial direction through the nuts for rough feeding. Owing to the coupling produced by hydrostatically coupling forces between the first table and the second table, the second table receives a thrust only in the axial direction, and any error in machining and assembling the table guideways and the feed screw, or any disturbance exerted by twisting motion of the feed screw will not be transmitted to the second table. Thus a table mechanism with a high degree of lineality can be provided. When the coupling by the hydrostatically coupling forces between the first table and the second table is produced by means of a ring-shaped hydrostatic pad, the restoring force to the moment of force is poorer in comparison with that of a plurality of divided hydrostatic pads, thereby heightening such an effect of preventing any disturbance from transmitting to the second table. After the rough positioning, by the release of one of the hydrostatically supporting forces of the opposed horizontal extensions of the first table, the other hydrostatically supporting force permits the first table to be firmly fixed to the bed. Thus high holding rigidity is provided. Next, with the first table as a reference for positioning, in response to the input control signal, the servo valve applies differential pressures to the hydrostatic pads opposed in coupling which is produced by the hydrostatic supporting forces between the first and second tables so as to move slightly the second table, thus compensating a high degree of positioning accuracy and maintaining a high degree of rigidity. In addition, the first table engaged with the nuts screwed onto the feed screw, and the second table driven by the first table are engagedly guided along the bed and the guideways formed on that bed, thus providing a simple construction. Therefore, this invention has effects of giving usefulness in many fields such as ultraprecision machine tools, measuring instruments and other production systems.

What is claimed is:

1. A table mechanism comprising:
   (1) a bed;
   (2) a horizontal guide and a vertical guide of said bed or formed on said bed;
   (3) a pair of supports fixed to said bed;
   (4) a motor fixed to one of said pair of supports;
   (5) a feed screw supported rotatably by said supports, connected to said motor and adapted to be turned by said motor;
   (6) a first table including nuts for screwing onto said feed screw and having a lower extension engagedly guided by said vertical guide and horizontal extensions engagedly guided by said horizontal guide, said first table moving straight through said nuts screwed onto said feed screw connected to said motor and adapted to be turned by said motor;
   (7) a second table having lower extensions engagedly guided by said vertical guide and horizontal extensions engagedly guided by said horizontal guide;
   (8) wherein, of the opposite surfaces between the lower extension of the first table and each of the lower extensions of the second table, on a pair of opposite surfaces opposed at right angles to a direction of movement of said tables, hydrostatically coupling portions comprising hydrostatic pads are formed; and between the upper surfaces of the horizontal extensions of both the tables and said horizontal guide, and between the lower surfaces of the horizontal extensions of both the tables and said horizontal guide, hydrostatically supporting horizontal portions comprising hydrostatic pads are formed;
   (9) gap detecting means on said hydrostatically coupling portions for detecting gaps in said hydrostatically coupling portions;
   (10) second table position detecting means provided on said second table for detecting an amount of movement of said second table;
   (11) a control unit for giving a movement command to said first table, computing a difference between said movement command value and the value of movement from the second table position detecting means for detecting the amount of movement of said second table, and giving a position correcting command to the second table;

(12) a first error detecting means for detecting a difference between the second table position correcting signal from the control unit and the gap detecting signal from said gap detecting means, and producing an error signal;

(13) a servo amplifier for amplifying said error signal; and

(14) a servo valve for supplying differential pressures to said hydrostatically coupling portions in synchronism with the error signal of said servo amplifier;

(15) wherein said second table is first moved by the movement of the first table which has been moved under the movement command from the control unit and by hydrostatically coupling forces produced between the first table and the second table, and then positioned precisely by supplying differential pressures to the hydrostatically coupling portions of the first and second tables under the position correcting command from the control unit.

2. The table mechanism according to claim 1 wherein said gap detecting means is provided each on a pair of opposite surfaces opposed at right angles to the direction of movement of said tables, a total of one pair of gap detecting means being thus provided, wherein a second error detecting means is further provided for detecting a difference between both outputs of said pair of gap detecting means, and wherein an output of said second error detecting means is used as a detecting signal of said first error detecting means.

3. The table mechanism according to claim 1 or 2 wherein each of said hydrostatically coupling portions is formed of a single ring-shaped hydrostatic pad.

* * * * *